INVENTOR
HOWARD G. HUGHEY
BY
Edmund W Bopp
AGENT

INVENTOR
HOWARD G. HUGHEY
BY
AGENT

INVENTOR
HOWARD G. HUGHEY
BY
Edmund W Bopp
AGENT

Feb. 20, 1968

H. G. HUGHEY 3,369,558

GAS MIXTURE PROPORTIONER

Filed Aug. 30, 1965

INVENTOR
HOWARD G. HUGHEY
BY

AGENT

United States Patent Office 3,369,558
Patented Feb. 20, 1968

3,369,558
GAS MIXTURE PROPORTIONER
Howard G. Hughey, Fanwood, N.J., assignor to Air Reduction Company, Incorporated, New York, N.Y., a corporation of New York
Filed Aug. 30, 1965, Ser. No. 483,652
8 Claims. (Cl. 137—88)

This invention relates to apparatus and methods for mixing gases as from individual gas supply lines or other suitable sources, in desired proportions, and for delivering the mixed gas, under desired pressure, to one or more storage containers or to a service line or the like.

An object of the invention is to facilitate the mixing of gases in desired proportions.

Another object is to extend the versatility of gas mixture proportioners.

Another object is to provide multiple operation of a plurality of gas mixture proportioning units in order to increase the available output of the system without increasing the size of the storage tank needed at the individual unit.

Another object is to achieve division of work load among a plurality of units connected in multiple.

Another object is to avoid the necessity of effecting simultaneous operation of pressure actuated electric switches in a plurality of units connected in multiple.

Another object is to avoid the use of mercury switches or other apparatus which necessitates leveling of the unit for proper operation.

A further object is to extend the capability of a gas mixture proportioner to the mixing of three or more gases.

A feature of the invention is that the mixing operation is independent of the withdrawal of the mixed gas for service.

Another feature is that the mixing occurs cyclically.

Another feature is that no resetting is required to resume operation after a failure and subsequent restoration of electrical power.

A further feature is that, with units operating in multiple, the units are interconnected electrically and gaswise so that all units that are ready to operate will cycle together. This is accomplished by means including an electrical jumper connection which does not exclude individual shut-off of any unit by manual means, nor does it exclude individual fail safe action of any unit.

A further feature is the use of calibrated valves having straight line output characteristics, controllable by micrometer means, such as a dial and pointer in conjunction with a full-turn indicator.

A further feature is that a wide range of flow rates is made available.

A further feature is that the outputs of a plurality of tanks may be manifolded and the combined output may then be regulated to a desired pressure.

A further feature is that a plurality of tanks may be used in various combinations, for example some tanks may be reserved to receive particular mixtures, thereby avoiding need for purging a tank when changing from one mixture to another and so avoiding waste of time and gas.

Other objects, features and advantages will appear from the following more detailed description of illustrative embodiments of the invention, which will now be given in conjunction with the accompanying drawings.

Figure 1:
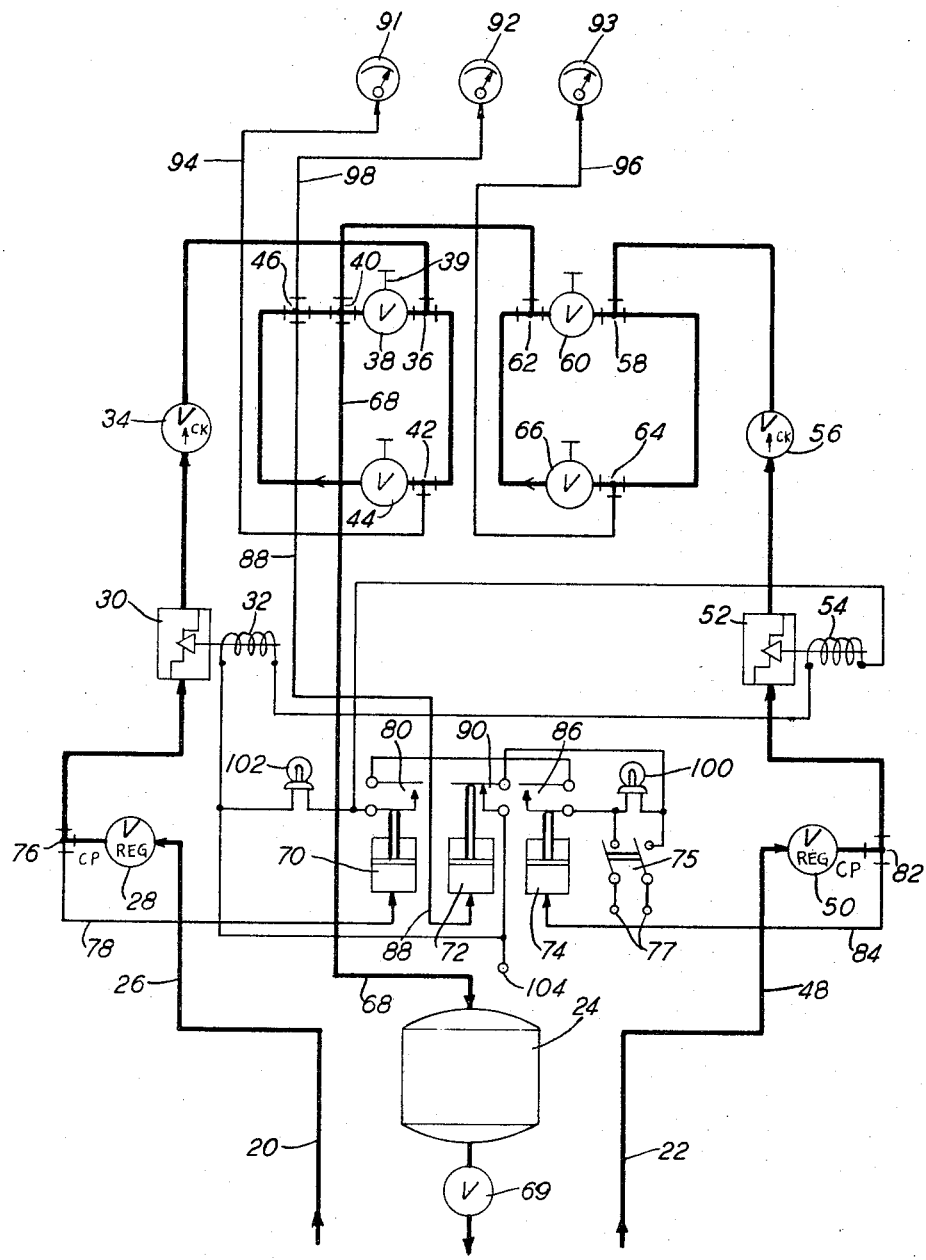
FIG. 1 is a schematic diagram of a gas mixture proportioning unit embodying the invention.

Referring to FIG. 1, there are shown gas supply lines 20 and 22 each of which contains a different gas, at a suitable pressure of, for example, 100 pounds per square inch. Examples of common gases to be mixed are nitrogen, oxygen, argon, carbon dioxide, hydrogen, and helium. Usually the desired mixtures are not explosive, but it will be evident that mixtures of hydrogen or other combustible gases with oxygen or other oxidizing gases embody hazard of explosion and require special precautions. It will be assumed in what follows that the desired mixtures are not explosive. A storage tank 24 is shown for receiving a mixture in desired proportions of the gases contained in the supply lines 20 and 22.

A conduit 26 connects the line 20 to the input side of a pressure regulating valve 28 for maintaining a constant pressure, of for example about 90 p.s.i., at the outlet of the valve 28. Gas flow from the line 20 is controlled by an open-or-shut valve 30 actuated by a solenoid 32. The gas path from the valve 30 goes by way of a check valve 34 to a T-fixture 36. To the left in the drawing from the fixture 36 the gas path goes through a calibrated straight-line characteristic measuring valve 38 to a cross-fixture 40. The valve 38 has a regulating shaft shown schematically at 39. To the right from the fixture 36 there is a parallel gas path through a T-fixture 42, another calibrated straight-line characteristic measuring valve 44, and another cross-fixture 46 into the cross-fixture 40.

Referring now to the line 22, a conduit 48, a pressure regulating valve 50, an open-or-shut valve 52 with a solenoid 54, and a check valve 56 form a gas path to a T-fixture 58. To the left in the drawing from the T-fixture 58 the gas path goes through a calibrated straight-line characteristic measuring valve 60 and a T-fixture 62 to the cross-fixture 40. To the right from the T-fixture 58 there is a parallel gas path through a T-fixture 64, and another calibrated straight-line characteristic measuring valve 66 to the T-fixture 62 and thence to the cross-member 40. By this means, gas from each of the lines 20 and 22 is measured and delivered to the cross-fixture 40 wherein it is mixed and delivered through a conduit 68 to the tank 24 where the mixed gas is stored and from which it is withdrawn as needed through a shut-off valve 69. A gas regulator (not shown) may be used to reduce from the pressure in the tank 24 to a desired pressure in a delivery line.

To control the operation of the solenoid valves 30 and 52, there are provided pressure actuated electrical switches 70, 72 and 74, and a master switch 75. Pressure switch 70 is responsive to pressure of the gas from the line 20 as sensed at a T-fixture 76 at the outlet of the regulating valve 28 and transmitted over a conduit 78 to the switch 70. A normally open pair 80 of electrical contacts is closed by pressure developed in the conduit 78 to close the contact pair 80 at, for example, 90 p.s.i. Pressure switch 74 is similarly responsive to pressure of the gas from the line 22 as sensed at a T-fixture 82 at the outlet of the regulating valve 50 and transmitted over a conduit 84 to the switch 74. A normally open electrical contact pair 86 is closed by pressure developed in the conduit 84 at, for example, 90 p.s.i. Pressure switch 72 is responsive to pressure of the mixed gas in the tank 24 as sensed at the cross-fixture 46 and transmitted over a conduit 88 to the switch 72. A normally closed electrical contact pair 90 is opened by pressure developed in the conduit 88 at some predetermined desired pressure, for example, in the range from 30 to 50 p.s.i. Pressure gauges 91, 92 and 93 may be provided to exhibit the existing pressures of the first gas, the mixed gas and the second gas, respectively. The pressure gauge 91 indicates the pressure sensed at the T-fixture 42 and transmitted over a conduit 94 to the gauge 91. The pressure gauge 93 similarly indicates the pressure sensed at the T-fixture 64 and transmitted over a conduit 96 to the gauge 93. The pressure gauge 92 indicates the pressure sensed at the cross-fixture 46 and transmitted over a conduit 98 to the gauge 92, which pressure is substantially the same as the pressure in the tank 24.

The electrical control circuit is energized from a pair of terminals 77 through the switch 75 in serial connection through the contact pairs 86 and 80, the solenoids 54 and 32, and the contact pair 90. A first signal lamp 100 is shown connected across the fixed terminals of the switch 75 and a second signal lamp 102 is shown connected in parallel with the series-connected solenoids 54 and 32. A terminal 104 is established at a point between the contact pair 90 and the adjacent terminal of the solenoid 32 for use in the event that it is desired to connect the unit shown in FIG. 1 in multiple with one or more similar units.

The purpose of using two calibrated valves to measure each of the two constituent gases is to make a coarse adjustment in one valve, for example valve 38, and a fine adjustment in the other valve 44. Similarly, for the second gas, the valve 60 may be used for coarse adjustment and the valve 66 for fine adjustment. The valve for coarse adjustment is designed for a large flow rate and the valve for fine adjustment for a smaller flow rate. Each valve is preferably of the type having a substantially straight-line relationship between the rate of flow of gas and the angle through which the valve stem is rotated from the closed position. If desired, a single measuring valve may be used in place of coarse and fine adjusting valves.

Figure 6:
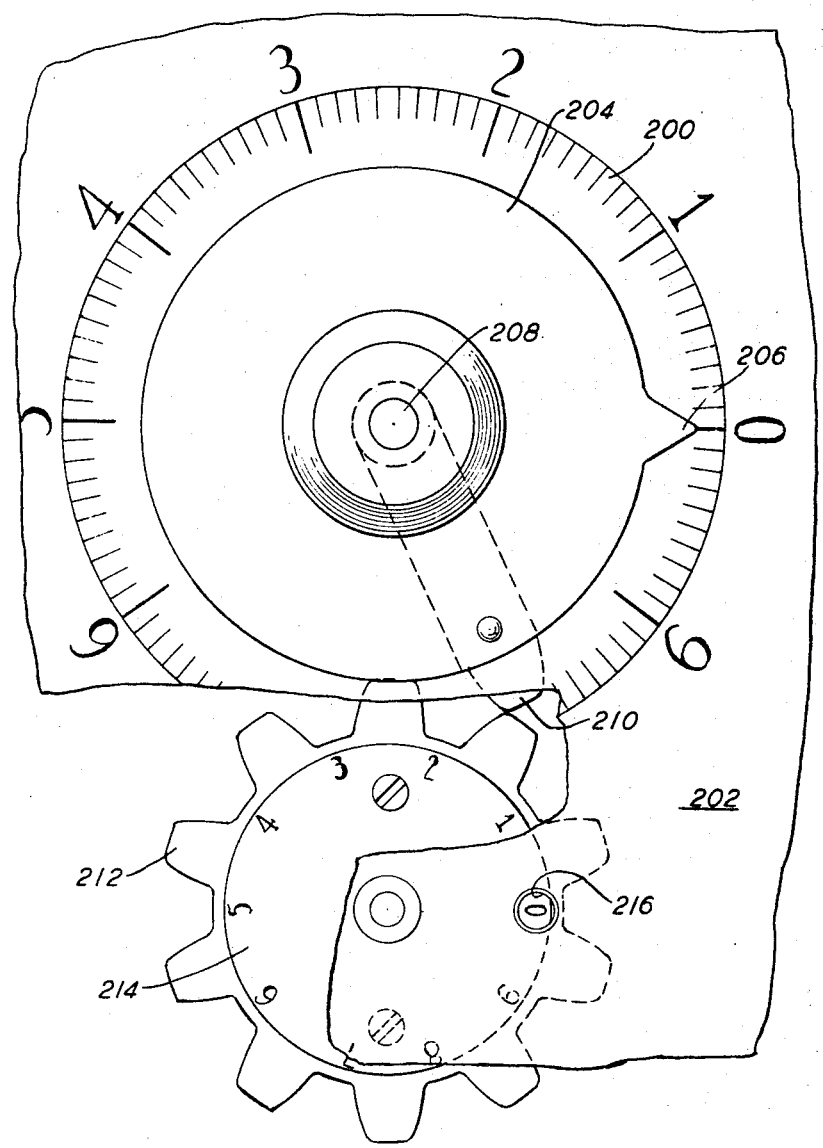
FIG. 6 is a diagrammatic representation of a dial, pointer and full-turn counter suitable for indicating the setting of a measuring valve in the system of FIG. 1.

Each of the calibrated measuring valves is preferably fitted with a suitable known micrometer setting and reading device, such as a dial and pointer associated with a revolution counter as illustrated in FIG. 6, or a micrometer screw and calibrated nut or the like.

The measuring valves may be calibrated by measurements with compressed air, which measurements can be converted to nitrogen, oxygen or other gas by using a known conversion factor. Due to the straight-line characteristic of the valve, two or three measured points are usually sufficient to establish the calibration curve.

When it is desired to dispense with adjustment of the proportionment of the constituent gases and operate with a mixture of one predetermined proportion, the valves 44 and 66 may be omitted and the valves 38 and 60 may be replaced with fixed orifices of such relative dimensions as to produce the desired mixture. Or, one valve, say valve 60, may be replaced by a trimmer orifice adjustable over a small range to permit a fine adjustment of the desired proportion. Usually the trimming is best done upon the gas which is to be the minor component of the mixture.

In the operation of the arrangement shown in FIG. 1, it will be assumed that the lines 20 and 22 are each charged with a different one of the gases to be mixed and that the respective pressures developed in the pressure switches 70 and 74 are each sufficient to actuate the switch, thus closing the contact pairs 80 and 86. It will also be assumed that the tank 24 has been properly purged and is ready to receive the mixed gas of the selected proportions of the two constituent gases. It will be assumed further that the calibrated valves 38, 44, 60 and 66 have all been adjusted according to their respective calibrations to pass the constituent gases in the desired proportions. Closure of the switch 75 will then complete a circuit for the lamp 100 to indicate that the power is on the unit, and will actuate the solenoids 32 and 54 through the series circuit by way of the contact pairs 86, 80 and 90, all of which are now closed. The lamp 102 will also be lighted to indicate that the gases are being mixed and supplied to the tank 24, both of the valves 30 and 52 having now been opened by the action of the respective solenoids 32 and 54. Charging of the tank 24 with the mixed gas will continue as long as the pressures of the constituent gases remain above the amount required to actuate the pressure switches 70 and 74, until such time as the pressure in the tank 24 reaches the preset value for actuating the pressure switch 72, at which time the contact pair 90 opens, breaking the electrical control circuit, causing the valves 30 and 52 to close so that mixing ceases and charging of the tank 24 stops. At the same time, the lamp 102 is extinguished to indicate that charging has ceased, while the lamp 100 remains lighted as long as the power is on and switch 75 is closed. If thereafter, gas is withdrawn from the tank 24 for use or if for any reason the pressure in tank 24 falls to such a value that the pressure switch relaxes and closes the contact pair 90, charging is resumed, provided always that contact pairs 80 and 86 and switch 75 are closed.

If the withdrawal rate of the gas mixture from the tank 24 is the maximum for which the unit is designed, the unit will operate continuously as long as the supplies of the constituent gases are maintained at sufficient pressure and the switch 75 remains closed. At lesser withdrawal rates, the sensing system causes replenishing of the charge of mixed gas in the tank 24 when required, resulting in cyclic operation of the unit. The mixing operation is entirely independent of the withdrawal rate up to the full capacity of the unit, so that the desired proportions of the gas mixture are maintained regardless of the withdrawal rate, within the limit of capacity.

With proper gas supply pressures provided and with the relative gas flow rates adjusted to give the desired mixture, the unit is placed in operation or shut down by use of the switch 75 alone. In case of power failure in the electrical control circuit, the unit shuts down but will resume operation automatically upon restoration of the power without need for any resetting operation.

Inadequate pressure of supply of either constituent gas brings about a fail safe condition, in that the electrical control circuit is broken thus closing both of the solenoid gas valves and thereby preventing either constituent gas from flowing into the mixing tank. The tank operating pressure actuates its pressure switch to shut off both of the solenoid valves when the maximum desired pressure is developed in the tank.

Figure 2:
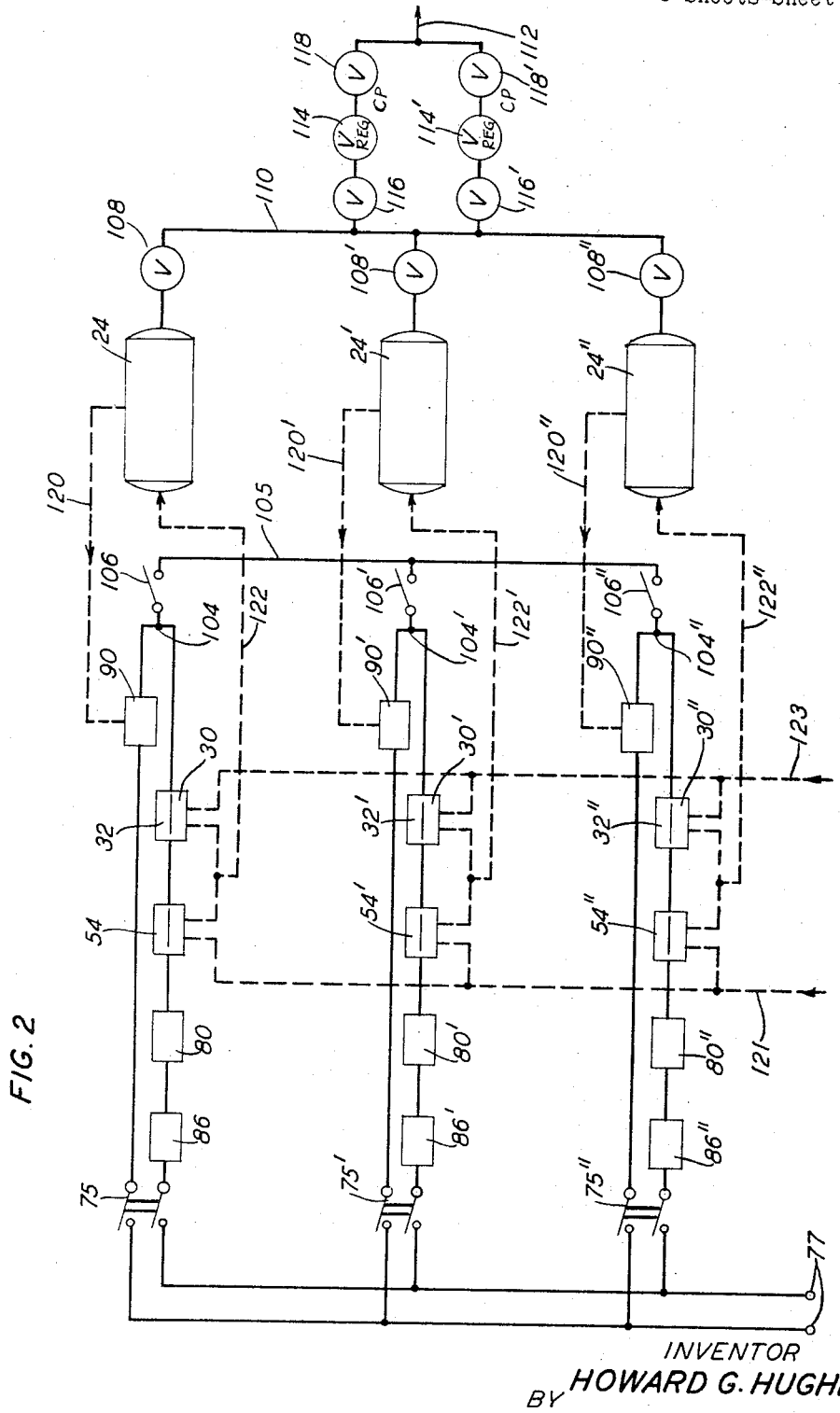
FIG. 2 is a schematic diagram showing how a plurality of units of the type shown in FIG. 1 may be connected in multiple to supply mixed gas to a common load with provision for causing the individual mixing units to operate simultaneously.

FIG. 2 shows at the left how the electrical control circuits of a plurality of units like that shown in FIG. 1 are to be interconnected to divide the load among the various units. At the right the figure shows how the gas outlets of the units are to be multiplied to supply the combined outputs of the units to a single utilization line.

The electrical components of each control circuit are represented by blocks identified by the reference numerals shown in FIG. 1, and the components of the second unit are designated by primed reference numerals corresponding to the components with unprimed reference numerals in the unit shown in FIG. 1. Similarly, the electrical components of the third unit are designated by double-primed reference numerals corresponding to the respective unprimed reference numerals in the unit shown in FIG. 1. The control circuits of the units shown in FIG. 2 are connected in parallel to the terminals 77. Each unit has a master switch and a serial combination of three contact pairs of pressure switches and two solenoids. A jumper 105 is provided which may be connected to the points 104, 104' and 104" in the respective units, by closing switches 106, 106' and 106". If desired, the jumper 105 may be a permanent connection of the terminals 104, 104' and 104".

As shown in FIG. 2, each of the electrical control circuits can operate as described in connection with FIG. 1. In addition, if any one unit is actuated, with the jumper 105 in effect, control current can flow through the control circuit of any of the other units even though the contact pair 90, 90' or 90" of such other unit is not closed.

FIG. 2 shows the individual tanks 24, 24' and 24" for holding the mixed gas. The outlets of the respective tanks are connected in multiple gas-wise by valves 108, 108', 108" and a manifold 110 to equalize the pressures in the respective tanks. By closing one of the valves 108, 108' or 108", one tank can be taken out of service for maintenance or repair, thereby preventing back flow from any tank into the tank that is out of service, while permitting pressure equalization among the tanks in service. Between the manifold 110 and a service line 112 there are preferably provided one or more pressure regulating valves 114, 114' which are each provided with isolating valves both upstream and downstream so that any regulating valve can be taken out of service for maintenance or repair without interfering with the proper operation of the system. The isolating valves for the regulator 114 are shown at 116 and 118, and those for the regulator 114' at 116' and 118'.

The pressure sensing line between the tank 24 and the pressure switch which actuates the contact pair 90 is indicated diagrammatically in FIG. 2 by a broken line 120. Similar sensing lines for the other units are shown at 120' and 120". The function of the solenoid valves actuated by the solenoids 54 and 30 is indicated by broken lines at 122 representing the supplying of mixed gas to the inlet of tank 24. Similar broken lines 122' and 122" are shown for the other units. One component gas is supplied in multiple to all the solenoid valves 54, 54', 54" from a supply line shown dotted at 121, and a second component gas is suppied to all the solenoid valves 32, 32', 32", from a second supply line shown dotted at 123. However, if desired, the mixer units may be supplied from separate sources.

It is advantageous to provide separate, relatively small capacity tanks 24, 24' and 24" instead of one larger tank. The smaller tanks are less expensive, more convenient, and can be combined in a variety of interconnections for special purposes.

The respective pressure switches 90, 90' and 90" are actuated by the pressure in the tanks 24, 24' and 24" which is the same in all the tanks due to the interconnection 110. However, the switches 90, 90' and 90" being of the usual type though set for nominally the same pressure will not open or close their associated contact pairs in unison. In practice, in the circuit of FIG. 2, the first of these switches to close as the tank pressure falls toward the set value will serve to extend the control circuit of its unit to connect with the control circuits in the other units to start up any unit which is conditioned for operation. Subsequent closing of the other switches will have no further effect. Similarly, when the tank pressure approaches the preset upper limit, the switch that operates at the lowest pressure opens first. This does not immediately shut down any unit because the other switches still provide current in the control circuits of all units. However, when the last switch of the group opens, all units shut down together. Thus, some one pressure switch takes control to start all units substantially simultaneously and one pressure switch, not necessarily the same one, takes control to stop all units simultaneously. Were it not for the electrical interconnection of the units, the first unit to start would immediately raise the tank pressure so that no other unit would be tripped on and the started unit would carry the entire load.

Figure 3:
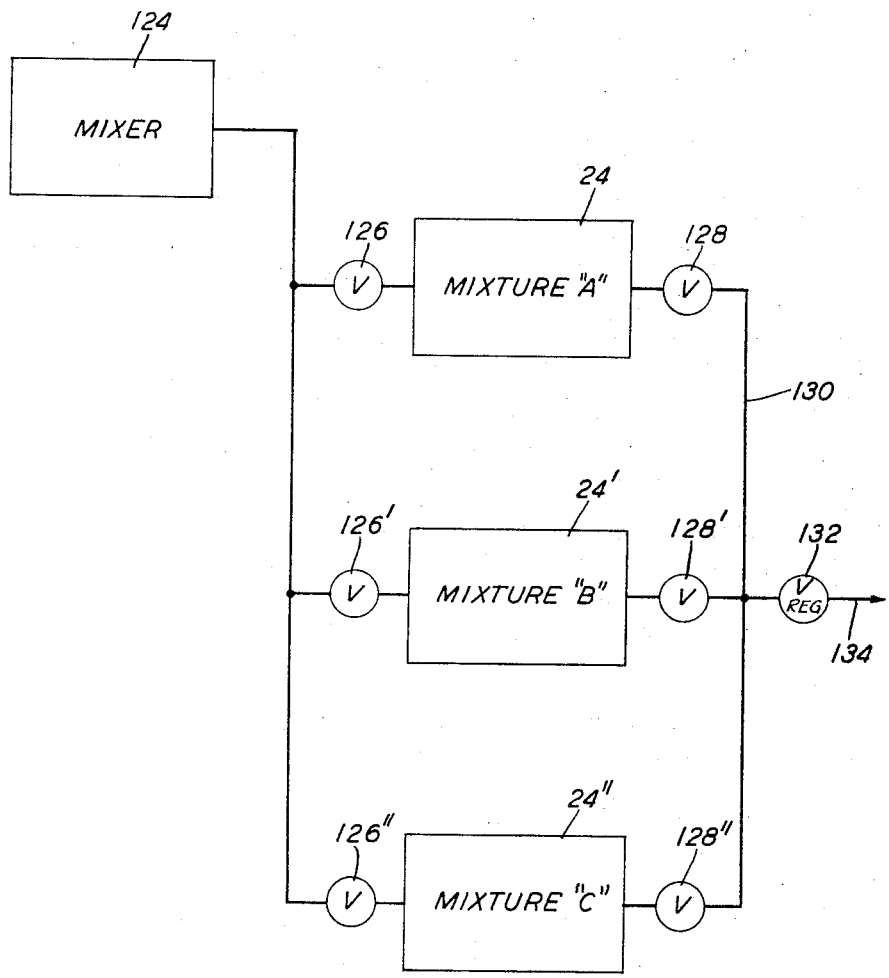
FIG. 3 is a schematic diagram showing a mixing unit arranged for selective connection to a plurality of storage tanks one at a time, each tank being reserved for a particular different gas mixture.

FIG. 3 shows how the tanks 24, 24' and 24" can be arranged on occasion for storing gas mixtures of different proportions, which tanks may be charged from time to time by a single mixing unit which is equipped for mixing gases in various proportions according to specification. A mixer 124 is shown, which may be a unit such as that shown in FIG. 1 except that the tank 24 is shown external to the rest of the unit. A plurality of tanks 24, 24' and 24" are connected in multiple to the outlet of the mixer 124, each tank being provided with isolating valves both upstream and downstream. The upstream isolating valves are shown at 126, 126' and 126", while the downstream valves are shown at 128, 128' and 128". The valves 128, 128' and 128" are connected to a manifold 130, which in turn is connected through a regulator 132 to a service line 134.

In the operation of the system of FIG. 3, the mixer 124 will be employed at times to provide a first mixture A which is supplied to the tank 24 by opening only the valve 126. At other times, the mixer 124 will be set up to provide a mixture B which is supplied to tank 24' through valve 126', valves 126 and 126" being closed. Similarly, at other times a mixture C is supplied to tank 24" through valve 126" with valves 126 and 126' closed. Withdrawal of any of the mixtures provided may be effected by opening a selected one of the valves 128, 128' or 128".

Figure 4:
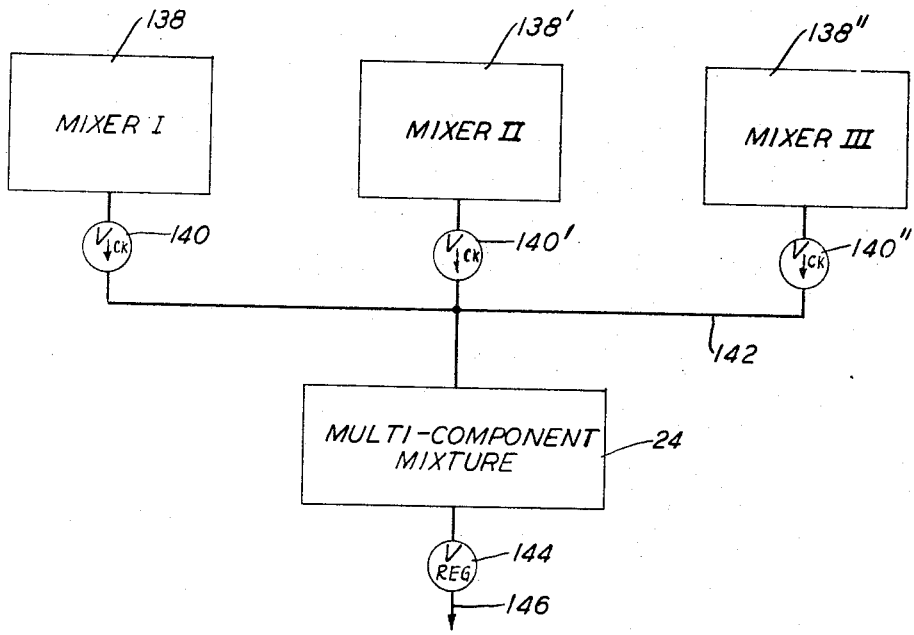
FIG. 4 is a schematic diagram showing a plurality of mixing units of the type shown in FIG. 1 connected to a single storage tank in order to supply a gas mixture of three or more component gases.
Figure 5:
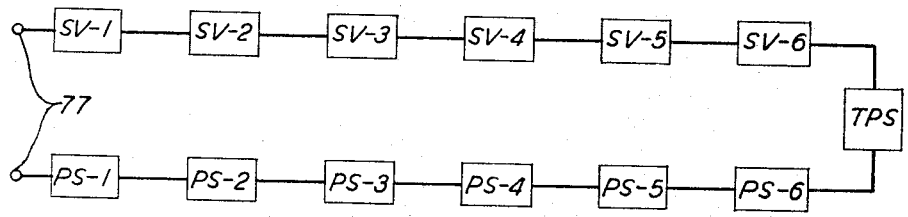
FIG. 5 is a schematic diagram of an electrical control circuit for use with a combination of mixing units as shown in FIG. 4.

FIG. 4 shows how two or more mixing units may be used to supply a single storage tank with a gas mixture of three or more component gases. Three mixer units 138, 138' and 138" are shown, connected respectively through isolating valves 140, 140' and 140" to a manifold 142, which in turn is connected to a single storage tank 24 and thence through a regulator 144 to a service line 146. Each mixer unit may combine two gases, giving an availability of two component gases per mixer. Electrical interconnections between the mixer units should be such as to assure that none of the solenoid valves in any of the mixers will open unless all the constituent gas supplies are up to operating pressure simultaneously, and that when this condition is fulfilled, all the solenoid valves will be opened simultaneously, to insure a uniform mixture in the tank 24. Such a control circuit is shown schematically in FIG. 5, wherein the contact pairs of six pressure switches, one for each of six gas supplies, are designated PS-1 through PS-6, respective solenoid windings for the solenoid valves for the six gases are designated SV-1 through SV-6, and a pressure switch contact pair for the mixed gas tank is designated TPS. The seven contact pairs and the six solenoid windings are all connected in series with the electrical supply terminals 77.

FIG. 6 shows a mircometer type of setting device for indicating the position of any one of the measuring valves such as 38, 44, 60 or 66 in the system of FIG. 1. The dial 200 may be marked upon a portion of the outer surface of an enclosing panel 202 of the gas proportioning unit. The dial is preferably divided into one hundred radial divisions in conventional manner. A disk 204 carrying a pointer 206 is mounted in front of the dial and arranged to turn the shaft 208 which regulates the setting of one of the measuring valves. For example, the shaft 208 in FIG. 6 may be the shaft 39 of the valve 38 in FIG. 1. Also attached to the shaft 208 is a single gear tooth 210 arranged to cooperate with a gear wheel 212 to which latter is preferably fastened a disk 214 marked with numerals to indicate full turns of the pointer 206. The tooth 210, gear 212 and disk 214 are preferably mounted behind the panel 202 with the disk 214 in front of the gear 212, with the numerals on the disk 214 arranged to become visible one at a time through a window 216 in the panel 202. At the completion of each complete turn of the pointer 206, the tooth 210 meshes with the gear 212 to advance the disk 214 to change from showing one numeral to showing the next higher numeral in known manner.

While illustrative forms of apparatus and methods in accordance with the invention have been described and shown herein, it will be understood that numerous changes may be made without departing from the general principles and scope of the invention.

I claim:

1. In a gas mixture proportioner, in combination, first and second gas sources, said gas sources having individual orifices relatively proportioned according to the desired gas mixture, individual electrically controlled normally closed shut-off valves for controlling the passage of gas from the respective gas sources through the respective orifices, individual pressure actuated normally open switches connected to be actuated by the gas pressure in the respective gas sources, means connected to said sources for mixing the outputs of gas from the two sources and supplying the gas mixture to a storage tank, a pressure actuated normally closed switch connected to be actuated by the gas pressure in said storage tank, and an electric control circuit serially connecting said plurality of shut-off valves and said plurality of pressure actuated switches, whereby said shut-off valves are opened provided the said normally open switches are closed by sufficient pressure in both said gas sources and provided the said normally closed switch is not opened by excessive pressure in said storage tank, thereby maintaining a charge of gas in the storage tank, which charge comprises a mixture of the desired proportions as determined by the said orifices.

2. Apparatus according to claim 1, in which at least one of said orifices is adjustable to select a desired gas mixture.

3. Apparatus according to claim 2, in which said adjustable orifice comprises a valve of continuously adjustable opening.

4. Apparatus according to claim 3, in which said adjustable orifice comprises a valve of calibrated adjustable opening.

5. Apparatus according to claim 4, in which said valve of calibrated adjustable opening is provided with a dial and pointer together with means for indicating complete turns of the valve.

6. Apparatus according to claim 1, together with a plurality of additional storage tanks, and means for switching the gas output from the gas mixture proportioner selectively to said storage tanks one at a time, whereby gas mixtures of different proportions can be delivered to the respective storage tanks.

7. In a gas mixture proportioner, a plurality of units each according to claim 1, in which the electric control circuit in each said unit extends from one side of an electric control circuit source directly to the said normally closed, pressure actuated switch that is connected to be actuated by pressure in the storage tank in said unit, and an electric jumper connection common to that side of each said storage tank pressure actuated switch remote from said respective control circuit source, whereby if any of said storage tank pressure actuated switches is closed the control circuit through said closed switch is extended to the respective control circuits of all the said units in order to actuate any unit which is ready when said last mentioned switch is closed.

8. Apparatus according to claim 7, together with means to equalize the pressure of the mixed gas in said storage tanks.

No references cited.

WILLIAM F. O'DEA, *Primary Examiner.*

D. J. ZOBKIW, *Assistant Examiner.*